United States Patent
Breuer et al.

(10) Patent No.: US 10,267,931 B1
(45) Date of Patent: Apr. 23, 2019

(54) RADIATION DETECTOR CAPABLE OF MEASURING DEPTH-OF-INTERACTION

(71) Applicant: Siemens Medical Solutions USA, Inc., Malvern, PA (US)

(72) Inventors: Johannes Breuer, Nürnberg (DE); Maciej P. Kapusta, Knoxville, TN (US); Matthias J. Schmand, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/889,453

(22) Filed: Feb. 6, 2018

(51) Int. Cl.
*G01T 1/20* (2006.01)
*G01T 1/29* (2006.01)

(52) U.S. Cl.
CPC .......... *G01T 1/2985* (2013.01); *G01T 1/2006* (2013.01); *G01T 1/20* (2013.01)

(58) Field of Classification Search
CPC ..... G01T 1/202; G01T 1/1642; G01T 1/2002; G01T 1/2018; G01T 1/2023; G01T 1/1644; G01T 1/2006; G01T 1/2008; G01T 1/201; G01T 1/244; G01T 1/2985; G01T 7/00
USPC ....................................................... 250/362
See application file for complete search history.

(56) References Cited

U.S. PATENT DOCUMENTS

| | | | | |
|---|---|---|---|---|
| 8,084,742 B1 * | 12/2011 | Nagarkar | ............. | G01T 1/2008 250/363.03 |
| 9,335,425 B2 * | 5/2016 | Dueppenbecker | .... | G01T 1/2985 |
| 2004/0159792 A1 * | 8/2004 | Andreaco | ............. | G01T 1/1644 250/363.03 |
| 2004/0178347 A1 * | 9/2004 | Murayama | ............ | G01T 1/1644 250/367 |
| 2005/0087693 A1 * | 4/2005 | Sumiya | ................. | G01T 1/2018 250/367 |
| 2006/0202125 A1 * | 9/2006 | Suhami | .................. | B82Y 20/00 250/368 |
| 2006/0243913 A1 * | 11/2006 | Overdick | .............. | G01T 1/2018 250/361 R |
| 2008/0284428 A1 * | 11/2008 | Fiedler | ................... | G01R 33/28 324/307 |

(Continued)

OTHER PUBLICATIONS

Belcari, N. et al., "Staggered double-layer array crystals for the reduction of the depth-of-interaction uncertainty in in-beam PET: A preliminary study" Elsevier, Nuclear Instruments and Methods in Physics Research, A 617 (2010), pp. 246-247.

(Continued)

*Primary Examiner* — Taeho Jo

(57) ABSTRACT

A radiation detector comprises a first scintillator having a first peak wavelength and a second scintillator positioned on the first scintillator. The second scintillator has a second peak wavelength different from the first peak wavelength. A plurality of photon detectors are provided. The first scintillator is positioned over and contacts each of the plurality of photon detectors. The plurality of photon detectors include first detectors and second detectors. The second detectors differ from the first detectors in doping profile, pn junction depth, or front-versus-backside illumination geometry. The first detectors are more sensitive to the first peak wavelength than the second peak wavelength. The second detectors are more sensitive to the second peak wavelength than the first detectors.

14 Claims, 11 Drawing Sheets

(56) References Cited

U.S. PATENT DOCUMENTS

| | | | |
|---|---|---|---|
| 2009/0072157 A1* | 3/2009 | Tonami | G01T 1/1644 250/367 |
| 2010/0102236 A1* | 4/2010 | Inoue | G01T 1/2018 250/361 R |
| 2010/0155610 A1* | 6/2010 | Menge | G01T 1/00 250/368 |
| 2011/0056618 A1* | 3/2011 | Tonami | G01T 1/2018 156/242 |
| 2011/0121184 A1* | 5/2011 | Inadama | G01T 1/1644 250/361 R |
| 2011/0192982 A1* | 8/2011 | Henseler | G01T 1/2985 250/362 |
| 2012/0121067 A1* | 5/2012 | Hayden | G01T 1/2018 378/62 |
| 2013/0056638 A1* | 3/2013 | Inadama | G01T 1/1644 250/362 |
| 2013/0193331 A1* | 8/2013 | Perna | G01T 1/2002 250/366 |
| 2013/0256538 A1* | 10/2013 | Vogtmeier | G01T 1/2008 250/366 |
| 2013/0292574 A1* | 11/2013 | Levene | G01T 1/2018 250/362 |
| 2014/0231655 A1* | 8/2014 | Dueppenbecker | G01T 1/2985 250/366 |
| 2015/0041661 A1* | 2/2015 | Tsuda | G01N 21/64 250/361 C |
| 2017/0212251 A1* | 7/2017 | Hadjioannou | G01T 1/2985 |
| 2017/0285184 A1* | 10/2017 | Yoshida | G01T 1/2018 |
| 2018/0136344 A1* | 5/2018 | Nelson | A61B 6/4233 |

OTHER PUBLICATIONS

Ito, Mikiko et al., "Positron Emission Tomography (PET) Detectors with Depth-of-Interaction (DOI) Capability" Biomed Eng Lett (2011) 1:70-81.

Seidel, J. et al., "Depth Identification Accuracy of a Three Layer Phoswich PET Detectot Module" IEEE Transaction on Nuclear Science, vol. 46, No. 3, Jun. 1999, pp. 485-490.

Shimazoe, K. et al., "Single Side Readout Depth of Interaction Method With Wavelength Discrimination" IEEE Transaction on Nuclear Science, vol. 63, No. 2, Apr. 2016, pp. 679-684.

Shimazoe, K. et al., "Color sensitive silicon photomultipliers with micro-cell level encoding for DOI PET detectors" Elsevier, Nuclear Instruments and Methods in Physics Research, A, vol. 873, 21 Nov. 2017, pp. 12-15.

Schultz-Coulon, Hans-Christian "Silicon Photomultipliers and their application in HEP and Medical Imaging" LHCb Retreat, Neckarzimmern, Mar. 2014, pp. 1-56.

Badoni, D. "SiPM a short introduction" Edit 2015 International School, Frascati Oct. 20-29, pp. 1-15.

"EJ-280 (green) and EJ-284 (red) wavelength shifting plastics" http://www.ggg-tech.co.jp/maker/eljen/ej-280_4.html.

* cited by examiner

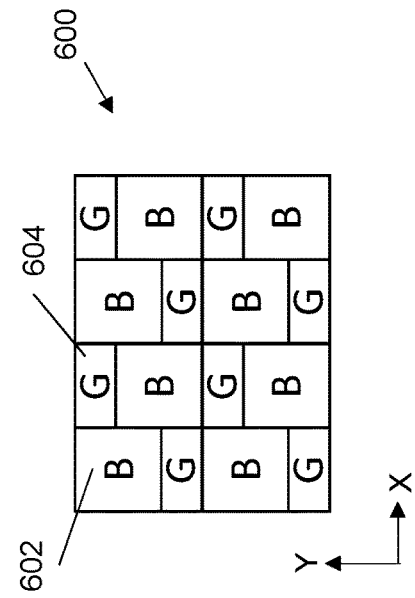
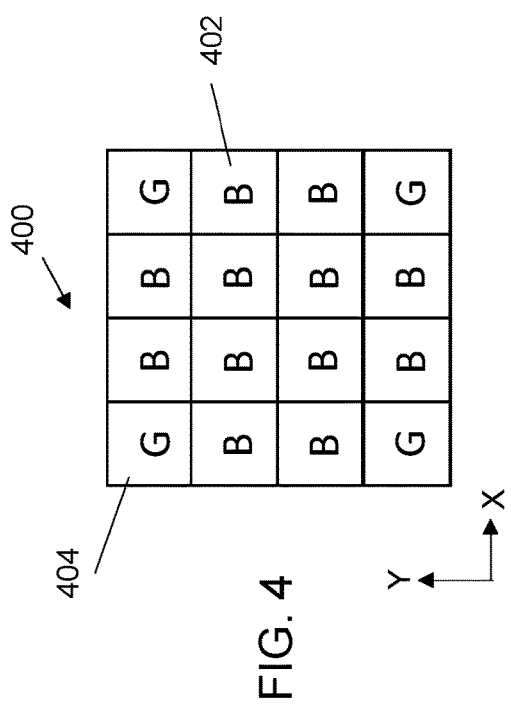
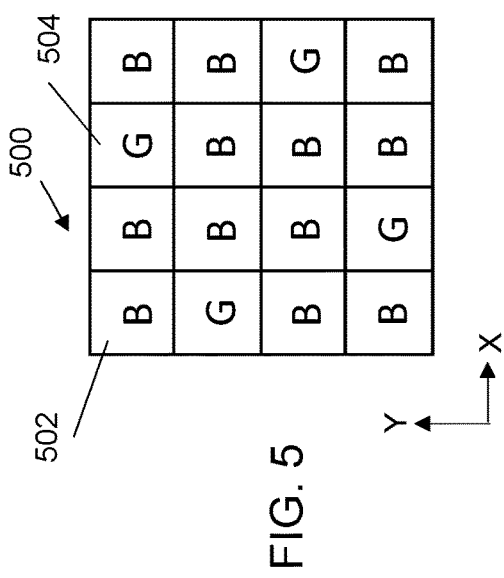
FIG. 4
FIG. 5
FIG. 6

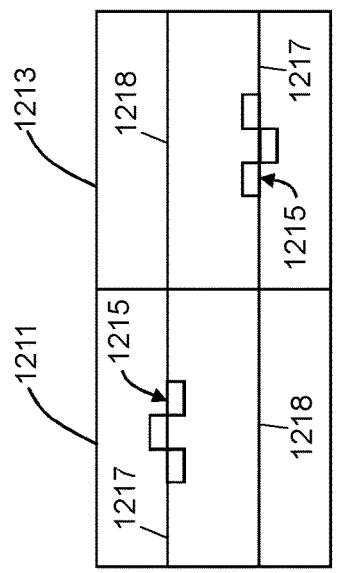
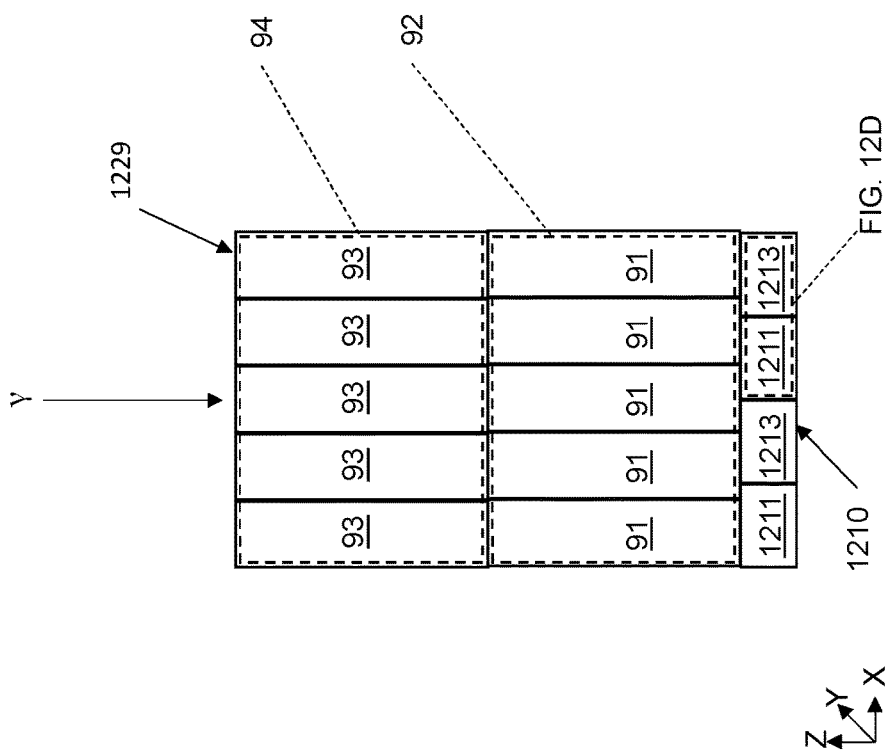

RADIATION DETECTOR CAPABLE OF MEASURING DEPTH-OF-INTERACTION

FIELD

This disclosure relates generally to medical imaging, and more specifically to a radiation detector for a medical imaging scanner.

BACKGROUND

Positron emission tomography (PET) is a modality of nuclear medicine for imaging metabolic processes using gamma photons emanated from radiopharmaceuticals ingested by a patient or injected into a patient. Multiple PET images are taken in multiple directions to generate/reconstruct a 3-dimensional PET image and/or multiple slices of a PET image. Before image reconstruction, raw PET data are in projection/sinogram space. PET scanning generally provides useful information regarding the functional condition of the body tissues and systems such as the cardiovascular system, respiratory system, and/or other systems. PET scanning is useful for indicating the presence of soft tissue tumors or decreased blood flow to certain organs or areas of the body.

PET scanners with cylindrical geometry can have a reduction in radial spatial resolution, which increases with increasing distance from the center of the field of view (FOV) of the scanner. The loss is due to a parallax effect, which is in turn due to uncertainty in determining a position of a positron-electron annihilation event ("gamma event") with respect to the line of response (LOR) that joins the scintillators involved in the interaction. When a source is relatively far from the central axis, the difference in position between the true line of flight (LOF) of the photon pair and the estimated LOR can be large. Thus, improvement in depth-of-interaction (DOI) measurement is desirable.

There are several methods to attain DOI information. Many approaches are based on a "stacked geometry" of the PET detector block. Two or more layers of scintillator arrays are provided. The gamma rays from a positron-electron annihilation event are absorbed by one of the scintillators, and cause emission of photons. DOI information can be obtained by determining in which layer of scintillator a gamma ray was actually absorbed.

SUMMARY

In some embodiments, a radiation detector comprises a first scintillator having a first peak wavelength and a second scintillator positioned on the first scintillator. The second scintillator has a second peak wavelength different from the first peak wavelength. A plurality of photon detectors are provided. The first scintillator is positioned over and contacting each of the plurality of photon detectors. The plurality of photon detectors include first detectors and second detectors. The second detectors differ from the first detectors in doping profile, pn junction depth, or front-versus-backside illumination geometry. The first detectors are more sensitive to the first peak wavelength than the second peak wavelength. The second detectors are more sensitive to the second peak wavelength than the first detectors.

In some embodiments, a positron emission tomography (PET) system, comprises a PET scanner. The PET scanner has a first scintillator having a first peak wavelength and a second scintillator positioned on the first scintillator. The second scintillator has a second peak wavelength different from the first peak wavelength. A plurality of photon detectors are provided. The first scintillator is positioned over and contacts each of the plurality of photon detectors. The plurality of photon detectors include first detectors and second detectors. The second detectors differ from the first detectors in doping profile, pn junction depth, or front-versus-backside illumination geometry. The first detectors are more sensitive to the first peak wavelength than the second peak wavelength. The second detectors are more sensitive to the second peak wavelength than the first detectors. A processor is configured to determine in which of the first scintillator or the second scintillator photons are emitted. The processor is configured to collect and store three-dimensional scan data received from said PET scanner.

In some embodiments, a method for measuring positron emission tomography data, comprises administering a tracer to a subject; detecting radiation emitted by decay of the tracer using first and second stacked scintillators. The first scintillator is above and contacting an array of silicon photomultipliers (SiPMs). The second scintillator is on the first scintillator. The array has a plurality of first SiPMs with a first peak wavelength, and a plurality of second SiPMs with a second peak wavelength different from the first peak wavelength. The second detectors differ from the first detectors in doping profile, pn junction depth, or front-versus-backside illumination geometry. The detecting includes; determining which of the first SiPMs or the second SiPMs outputs more energy in response to the detecting; and identifying a depth of interaction of the radiation based on which of the first SiPMs or the second SiPMs outputs more energy.

BRIEF DESCRIPTION OF THE DRAWINGS

FIGS. 4-10 show variations of the photon detector array of FIG. 3.

FIG. 12C is a cross-sectional view of a radiation detector for the PET scanner of FIG. 1, in which the SiPMs have different front-versus-backside illumination geometries.

FIG. 12D is an enlarged detail of FIG. 12C.

DETAILED DESCRIPTION

Figure 1:
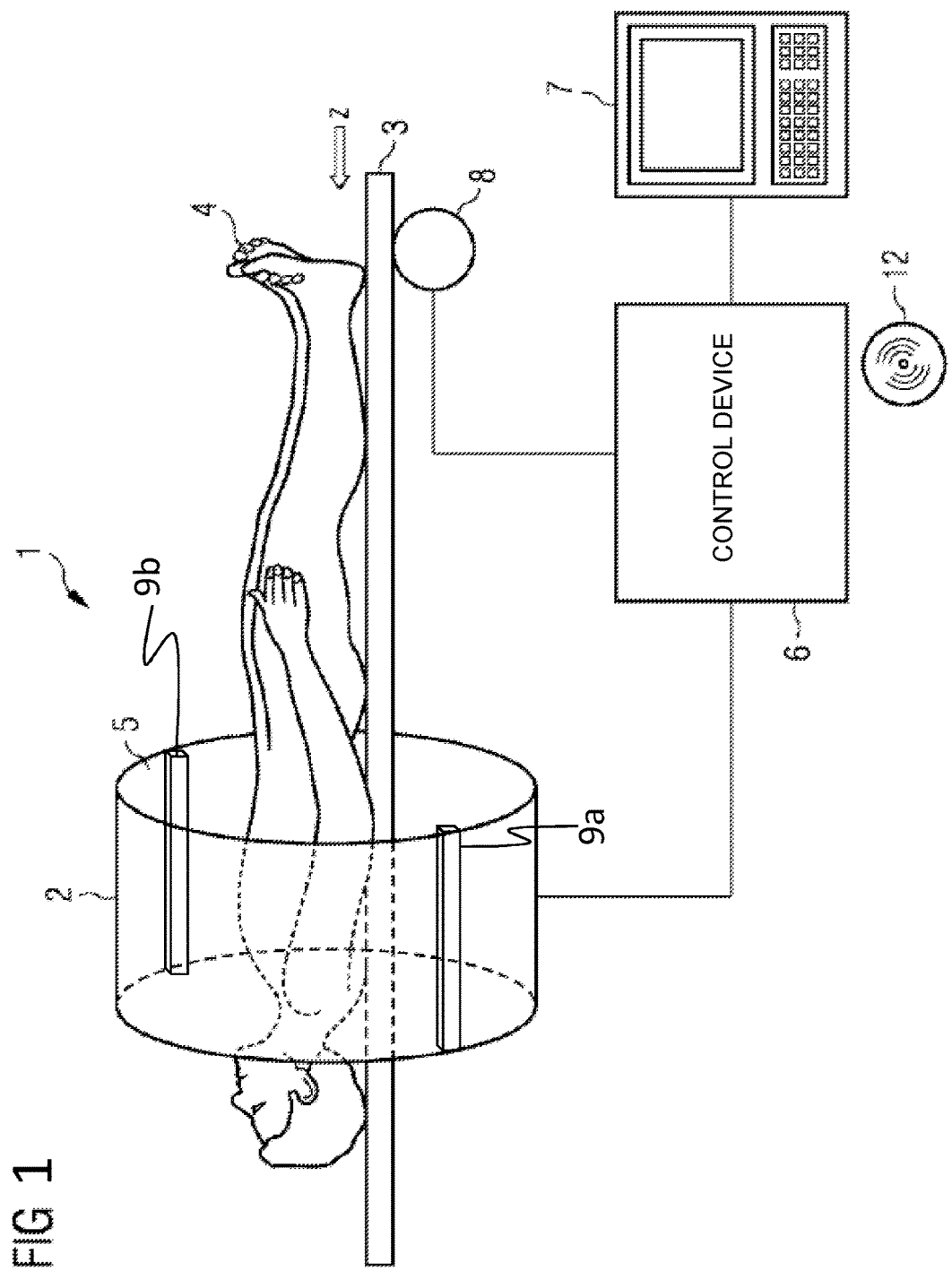
FIG. 1 is a schematic diagram of an exemplary positron emission tomography (PET) system.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Radiation detectors (e.g., phoswich detector or Positron emission tomography (PET) block detector) can measure depth-of-interaction (DOI) information for each particle or gamma event. This additional DOI information allows a more accurate determination of the respective line-of-response (LOR) sinogram position for each gamma event. In turn, the achievable spatial resolution improves, and finer structures can be resolved, which can have a positive impact on the diagnostic value of the reconstructed images.

According to one aspect of this disclosure, a positron-emission-tomography (PET) scanner includes a PET block detector capable of measuring depth-of-interaction (DOI). The PET block detector comprises two or more scintillators, stacked one-above-the-other and having respectively different peak wavelengths and/or emission spectrum characteristics. The bottom scintillator is positioned directly on a two-dimensional (2D) array of phoswich detectors, such as silicon photomultipliers (SiPMs), without color filters between the SiPMs and the bottom scintillator. The 2D array can have equal numbers of two types of SiPMs, each type having a different spectral response characteristic from the other, so comparison of the total energy collected by all of the SiPMs of each individual type indicates in which of the scintillators the gamma event occurs. Because there are no color filters between the SiPMs and the scintillators, attenuation of the light rays emitted by the scintillators is avoided, wavelength shifts (and corresponding timing shifts) are avoided, and blurring of the sinogram data is reduced.

In some embodiments, a radiation detector comprises a plurality of scintillators. A first one of the scintillators is positioned over and contacting each of the plurality of photon detectors. Each photon detector is capable of detecting impingement of photons thereon. The plurality of photon detectors include first detectors and second detectors. The first detectors are more sensitive to the distribution of light in first emission spectrum than the second emission spectrum. The second detectors are more sensitive to the distribution of light in the second emission spectrum than the distribution of light in the first emission spectrum. The first detectors are more sensitive to the first peak wavelength than the second peak wavelength. The second detectors are more sensitive to the second peak wavelength than are the first detectors. In some embodiments, the second detectors are more sensitive to the second peak wavelength than first peak wavelength.

The two or more layers of scintillators can be made of two different scintillator materials which have two different peak emission wavelengths. In some embodiments, there are no reflectors between the scintillators. In other embodiments the scintillator layers have reflectors only covering part of the length (in the Z direction) of the scintillators, so that the light is shared across the entire detector block (in the X and/or Y directions).

FIG. 1 shows a schematic diagram of a positron emission tomography (PET) system 1. The system 1 comprises: a tomograph 2, an examination table 3 for a patient 4 who can be moved on the examination table 3 through an opening 5 of the tomograph, a control device 6, a processor 7 and a drive unit 8. The control device 6 activates the tomograph 2 and receives from the tomograph 2 signals which are picked up by the tomograph 2. With the aid of the tomograph 2 positron emission sinogram data can be collected. Also disposed in the tomograph 2 is a ring of PET detector blocks 9a, 9b (collectively referred to as 9) for acquiring photons which are created by annihilation of electrons and positrons in the PET detector blocks 9a, 9b. Although only 2 detector blocks 9a, 9b are shown in FIG. 1 for ease of viewing, tomograph 2 can have many detector blocks 9 arranged around the circumference of the tomograph 2. The control device 6 is further operable to receive signals from the detector blocks 9a, 9b and is capable of evaluating these signals for creating positron emission tomography images. The control device 6 further activates the drive unit 8 in order to move the examination table 3 in a direction Z together with the patient 4 through the opening 5 of the tomograph 2. The control device 6 and the processor 7 can, for example, comprise a computer system with a screen, a keyboard and a data medium 12 on which electronically-readable control information is stored, which is embodied so that it carries out the method described below when the data medium 12 is used in the processor 7 and the control device 6.

Figure 2:
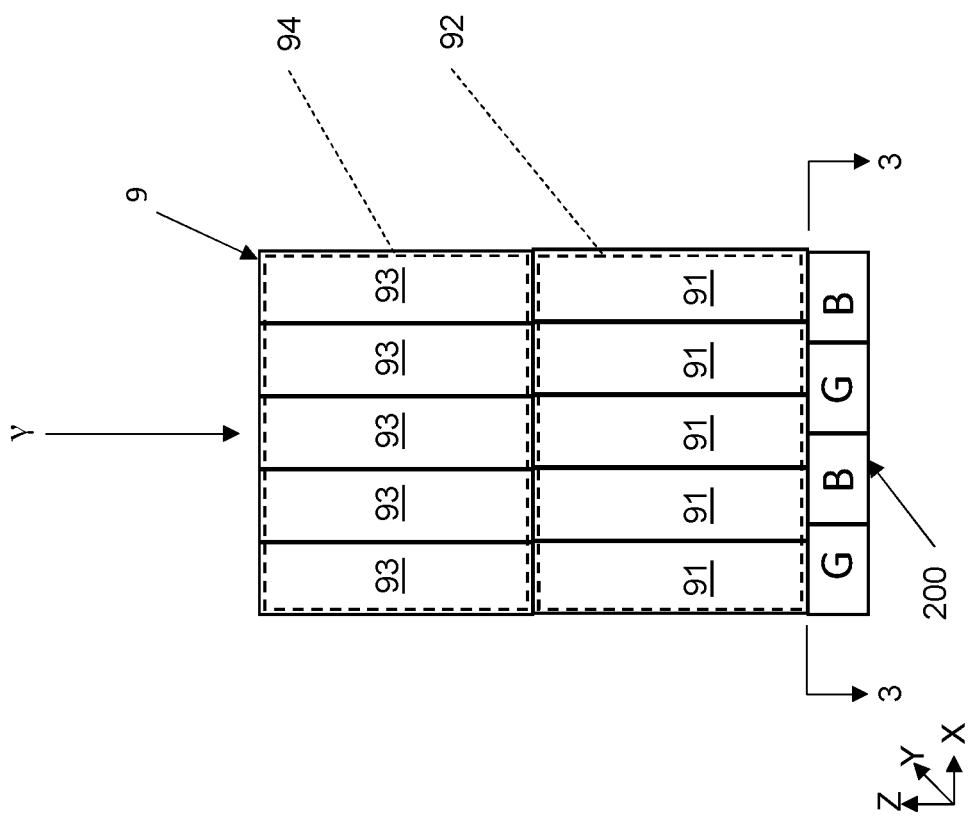
FIG. 2 is a cross sectional view of a PET block detector from the PET scanner of FIG. 1.

FIG. 2 is a cross sectional diagram of a radiation detector 9 sensitive to gamma radiation y or other radiation (e.g., X-ray, alpha particles, beta particles). PET detector block 9, which is representative of PET detector blocks 9a and 9b (FIG. 1). The detector block 9 comprises two or more layers (e.g., crystal layers) 92 and 94. A first scintillator layer 92 may have one or more scintillators 91 of a first scintillation material having a first peak wavelength and first emission spectrum. A second scintillator layer 94 is positioned on the first scintillator layer 92. The second scintillator layer 94 has a plurality of layers (e.g., crystals) 93 of a second scintillation material. The second scintillator has a second peak wavelength and second emission spectrum different from the first peak wavelength and emission spectrum. Scintillator layer 92 can have many crystals 91, and Scintillator layer 94 can have many crystals 93. For example, FIG. 2 shows an arrangement with a 5×5 array of crystals 91 and a 5×5 array of crystals 93. The number of crystals 91, 93 in the scintillator layers 92, 94 can be varied (e.g., 3×3, 4×4, 4×8, etc.). The first scintillator layer 92 and the second scintillator layer 94 can have the same number of crystals as each other.

In some embodiments, there are no reflectors between the crystals 91, 93 within each scintillator layer 92, 94. In other embodiments the scintillator layers 92, 94 can include reflectors (not shown) which cover only part of the length of each scintillator, such that the light is shared across the entire scintillator layer. In other embodiments (not shown), each scintillator layer 92, 94 includes a single monolithic crystal (not shown).

The first and second scintillator materials have different emission characteristic spectrums from each other. The first and second scintillator materials have different emission peak wavelengths from each other, as discussed below with respect to FIG. 13. In some embodiments, the first and second scintillator materials emit different colors of light from each other.

Referring again to FIG. 2, in some embodiments, the first scintillator layer 92 comprises Lutetium-yttrium oxyorthosilicate, $Lu_{2(1-x)}Y_{2x}SiO_5$, (LYSO) and emits blue light upon absorbing high energy photons. The second scintillator layer 94 can be green-shifted relative to the first scintillator layer 92. For example, in some embodiments, the second scintillator 94 comprises $Gd_3Al_2Ga_3O_{12}$, (GAGG), BGO, or garnet structures, and emits green light upon absorbing high energy photons. In other embodiments, the scintillator layers 92, 94 can comprise other scintillation materials. In some embodiments, the first scintillation material of scintillator layer 92 is NaI(TI) and the second scintillation material of scintillator layer 94 is BGO. In other embodiments, the first scintillation material of scintillator layer 92 is LSO and the second scintillation material of scintillator layer 94 is LuYAP. These are only examples, and are not exclusive.

Directly underneath the first scintillator layer 92 is an array 200 of two groups of photon detectors, such as SiPMs 202 and 204, labeled B and G, respectively. The first scintillator layer is positioned over and contacting each of the plurality of photon detectors 202, 204. Each photon detector 202, 204 is capable of detecting impingement of a single photon thereon. The plurality of photon detectors include first detectors 202 sensitive to photons of the first peak wavelength and first emission spectrum and second detectors 204 sensitive to photons of the second peak wavelength and second emission spectrum.

Figure 3:
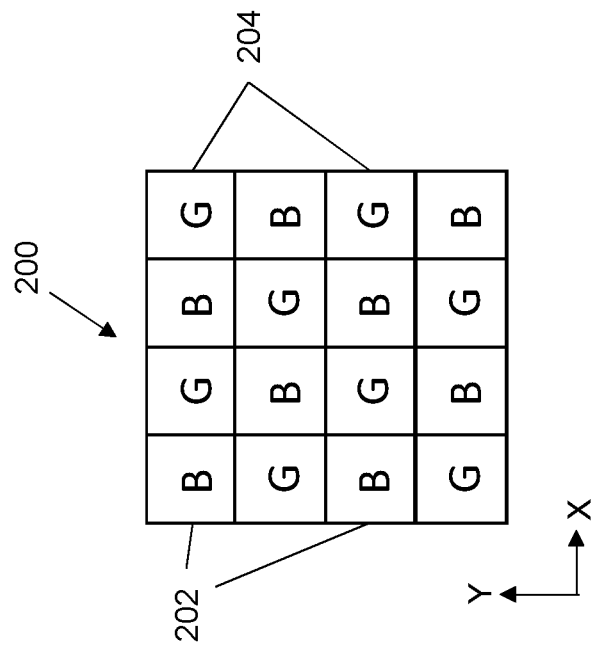
FIG. 3 is a plan view of the photon detector array of FIG. 2, taken along section line 3-3.

The first detectors (SiPMs) 202 and second detectors (SiPMs) 204 are arranged in a two-dimensional (2D) array 200 for measuring 2D coordinates of each impinging photon. The SiPMs 202, 204 can be arranged in a checkerboard pattern with alternating colors in each direction, as shown in FIG. 3, for example. The SiPMs 202, 204 do not include color filters, and there are no color filters between the SiPMs 202, 204 and the first scintillator layer 92. This configuration avoids attenuation (due to light absorption by color filters), and reduces blurring of the light impinging on the detector array 200.

In the example of FIGS. 2 and 3, the scintillator layers 92, 94 have more crystals 91, 93 per layer than there are SiPMs 202, 204 in the array 200. The PET detector block 9 has 5×5 arrays of crystals 91, 93 in the scintillator layers 92, 94, and a 4×4 array 200 of SiPMs 202, 204. This is only one example and is not limiting. For example, the number of crystals 91, 93 in each scintillator layer 92, 94 can be equal to, or greater than, the number of SiPMs 202, 204 in the array 200.

The difference in the spectral sensitivity of the two kinds of SiPMs 202, 204 can be achieved by using intrinsic properties of the semiconductor-based photo sensors (e.g. doping profile, pn junction depth, or front-versus-backside illumination geometry). For example, the first detectors and second detectors can have different doping profiles (for example with different depths of the multiplication zone or doping concentrations) or other micro-cell features.

The doping profile determines the shape of the electric field in a semi-conductor device, such as an avalanche photodiode (APD) used in an SiPM. At the pn-junction there is a strong electric field, which provides the multiplication of the charge carriers (avalanche effect). The multiplication or avalanche region is adjacent to a "drift region" (p-doped) having a lower electric field. If a photon is absorbed in the drift region, the electron can drift to the multiplication region, where it is multiplied. If the photon is absorbed in the multiplication (avalanche) region, it can also be multiplied. So, the SiPM creates a measurable signal, when the incident photon is absorbed in the drift or multiplication region.

The absorption length of photons in silicon is wavelength-dependent. If the pn-junction (and therefore the multiplication and drift region) is deeper in the silicon, red light will have a higher probability of being measured because red photons can penetrate silicon more deeply and blue photons have been already absorbed before reaching the pn-junction. If the pn-junction is closer to the surface, the SiPM will be more blue-sensitive, because the blue light is absorbed closer to the surface and a large portion of the red photons will pass through the pn-junction and drift region without being absorbed.

Figure 13:
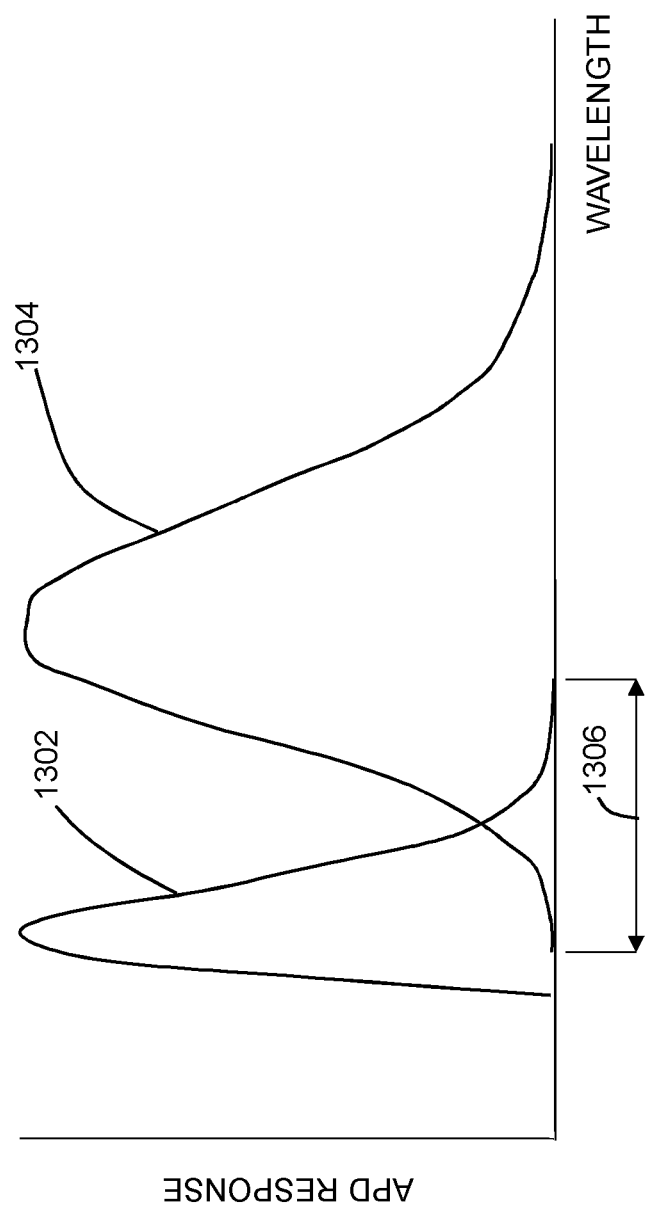
FIG. 13 is a diagram showing spectral responses of two SiPMs to red and blue light.

For example, FIG. 13 is a diagram of a spectral response 1302 of a first SiPM to blue light, and a spectral response 1304 of a second SiPM to red light. Although the first SiPM and second SiPM have distinct peaks, there is an overlapping range 1306 of wavelengths, in which both the first SiPM and the second SiPM output a non-zero value. As a result, an SiPM can be optimized for detecting blue light, and have a smaller, but non-zero, response to red and green light.

A difference in emission spectra, as shown qualitatively in FIG. 13, can be achieved by different pn junction depth or different doping profile (i.e., the profile of dopant concentration as a function of depth is different for each type of SiPM).

Similarly, an APD that is more green-sensitive can be achieved with a different pn-junction depth. The SiPM can be optimized for detecting green light, and have a smaller, but non-zero, response to red and blue light. Thus, APDs having different spectral responses can be provided by using different pn-junction depths below the surface of the semiconductor (e.g., silicon) substrate. SiPMs 202 and 204 having different spectral responses from each other can be produced by including APDs with respectively different doping profile, pn junction depth, or front-versus-backside illumination geometry in the SiPMs 202 and 204.

Although exemplary photon detectors 202, 204 are described above, any "phoswich" detector capable of detecting low-intensity, low-energy radiation can be used. Here, the term "phoswich" refers to a detector capable of performing this detection function, and is not limited to phosphor sandwich type phoswich devices. The radiation detector 9 can include other phoswich detectors, as appropriate for applications including, but not limited to, PET over SPECT to homeland security.

Referring again to FIG. 2, the spectral response of the SiPMs 204 is sufficiently different from the spectral response of the SiPMs 202, so that the light emitted by the two scintillator materials in scintillator layers 92 and 94 can be distinguished from one another. In FIGS. 2 and 3, "B" is used as an acronym for mainly blue-sensitive SiPMs and "G" for mainly green-sensitive SiPMs. However, this is only a non-exclusive example, and the method does not require a narrow region of response just in the blue or green regions.

In some embodiments, SiPMs 202 have their peak response to light at or near the peak wavelength emitted by the first scintillator layer 92; and SiPMs 204 have their peak response to light at or near the peak wavelength emitted by the second scintillator layer 94. However, the method does not require the SiPMs 202, 204 to have their peak responses at the same frequencies as the scintillator layers 92, 94. For example, the array 200 can detect in which scintillator layer 92, 94 the gamma event occurs if: (a) the SiPMs 202 output more total current if a gamma event occurs in the first scintillator layer 92 than if a gamma event occurs in the second scintillator layer 94; and (b) the SiPMs 204 output more total current if a gamma event occurs in the second scintillator layer 94 than if a gamma event occurs in the first scintillator layer 92.

The signals of each event are read out by Anger logic which yields an X and Y position to identify the lateral position of the gamma event within the detector block 9. Anger logic is a procedure to obtain the position of incidence of a photon (in the X, Y plane) on the scintillator crystal 91 or 93, which involves connecting the SiPM outputs to a resistive network to obtain only four outputs. With these signals, the position of the scintillation centroid can be obtained.

Additionally, the signals of all SiPMs 202 belonging to the first group ("B") are summed to calculate a first energy value. Also, the signals of all SiPMs 204 belonging to the second group ("G") are summed to calculate a second energy value. Finally, the DOI information can be calculated based on the ratio between the first and second energy values. The threshold ratio between the energy values of the two different scintillator layers 92, 94 is dependent on the two types of scintillator materials.

The layout of photon detector 200 is only exemplary and is not limiting. A variety of photon detector examples are shown in FIGS. 4-10. In each of the examples of FIGS. 4-10, the first and second scintillator materials have different emission characteristic spectrums from each other; the first and second scintillator materials have different emission spectra and different peak wavelengths from each other; and the first scintillator layer 92 lies directly on (i.e., contacting) the SiPMs with no intervening color filters.

Some embodiments use two different types of SiPMs, where a first type provides better sensitivity than the second type. Some embodiments can take advantage of the sensitivity characteristics by having a majority of the area of the photon detector occupied by the more sensitive type of SiPMs (e.g., the blue-sensitive SiPMs comprising LYSO) and having a minority of the area of the photon detector occupied by the less sensitive type (e.g., green-sensitive) of SiPMs or smaller green-sensitive SiPM chips. This can be accomplished by using fewer second detectors (e.g., FIGS. 4 and 5) or smaller second detectors (e.g., FIG. 6) compared to the photon detector 200 (FIG. 3). This way, the packing fraction of the more sensitive SIPM is increased, and the overall performance (e.g. timing and energy resolution) is improved. FIGS. 4-6 show three different arrangements in which the first (B) detectors occupy a greater area than the second (G) detectors.

FIG. 4 shows an example of a photon detector 400, which can be substituted for the photon detector 200 in the radiation detector 9 of FIG. 2 in some embodiments. In the photon detector 400, a respective second detector 404 (e.g., green) is located in each of a plurality of corners of the 2D array 400, and a remainder of the plurality of photon detectors comprises first detectors 402 (e.g., blue). The photon detector 400 of FIG. 4 can provide better time resolution for the first (blue) detectors 402. The photon detector 400 of FIG. 4 can provide good differentiation between the first detectors 402 (B) and the second detectors 404 (G), due to the high probability of detecting blue light.

FIG. 5 shows an alternative layout of a photon detector 500, which can be substituted for the photon detector 200 in the radiation detector 9 of FIG. 2 in some embodiments. In the photon detector 500, the 2D array 500 has a plurality of rows and a plurality of columns. Each of the plurality of rows includes at least one first detector 502 (B) and at least one second detector 504 (G). Each of the plurality of columns includes at least one first detector 502 (B) and at least one second detector 504 (G). In some embodiments, as shown in FIG. 5, each of the corners has a first detector 502 (B), each of the plurality of rows includes a second detector 504 (G), and each of the plurality of columns includes a single second detector 504 (G). In some embodiments, each row has a different arrangement of first and second detectors from each other row, and each column has a different arrangement of first and second detectors from each other column. The photon detector 500 of FIG. 5 can provide better time resolution for the first (blue) detectors 502, and can provide good differentiation between the first detectors 502 (B) and the second detectors 504 (G).

FIG. 6 shows an alternative layout of a photon detector 600, which can be substituted for the photon detector 200 in the radiation detector 9 of FIG. 2 in some embodiments. In the photon detector 600, the first detectors (SiPMs) 602 and second detectors (SiPMs) 604 are arranged in a two-dimensional (2D) array 600 for measuring 2D coordinates of each impinging photon. The SiPMs 602, 604 can be arranged with alternating colors in each direction. Each of the first detectors 602 has a first area, each of the second detectors 604 has a second area, and the first area is greater than the second area. For example, the first detectors 602 can be identical to the first detectors 202 of FIG. 3. The second detectors 604 can be smaller (and hence less sensitive) than the second detectors 202 of FIG. 3. That is, the total area of one first detector 602 plus one second detector 604 can be less than the total area of a first detector 202 plus a second detector 204 of the photon detector 200 of FIG. 3. The configuration of photon detector 600 provides the same resolution and performance for the first (blue) detectors 602 as in the photon detector 200 of FIG. 3. The configuration of photon detector 600 also provides good differentiation between the first detectors 602 (B) and the second detectors 604 (G), even though the smaller second detectors provide lower resolution than the detectors 602.

Figure 7:
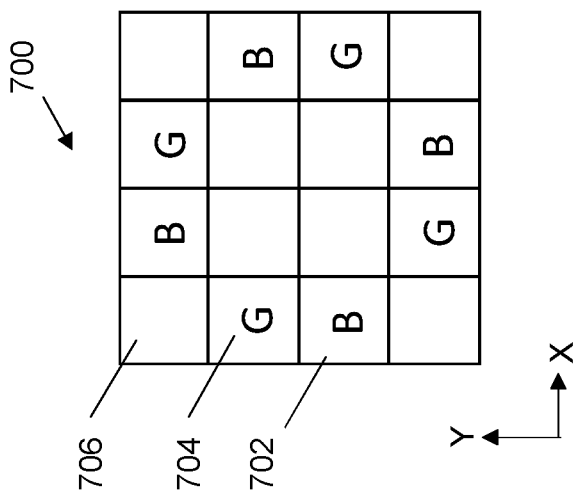

FIG. 7 shows an alternative photon detector configuration 700, which can be substituted for the photon detector 200 in the radiation detector 9 of FIG. 2 in some embodiments. The photon detector 700 can contain fewer SiPMs at a lower total cost. The first detectors 702 and second detectors 704 can be the same as the first detectors 202 and second detectors 204 of FIG. 3. The floor plan of the photon detector 700 is sparsely populated, including a plurality of vacant regions 706 without any SiPMs. The 2D array 700 has a plurality of sides. Each of the plurality of sides has a border row or a border column adjacent thereto. Each border row has at least one first detector 702 and at least one second detector 704, and each border column has at least one first detector 702 and at least one second detector 704. Each border row and each border column has at least one cell without a photon detector. In some embodiments, each of the plurality of rows includes at least one first detector 702 (B) and at least one second detector 704 (G). Each of the plurality of columns includes at least one first detector 702 (B) and at least one second detector 704 (G). This configuration provides the same differentiation performance for both B and G type SiPMs, and thus provides the same Z-direction performance for gamma events in the first scintillator layer 92 and the second scintillator layer 94 for determining the DOI.

Figure 8:
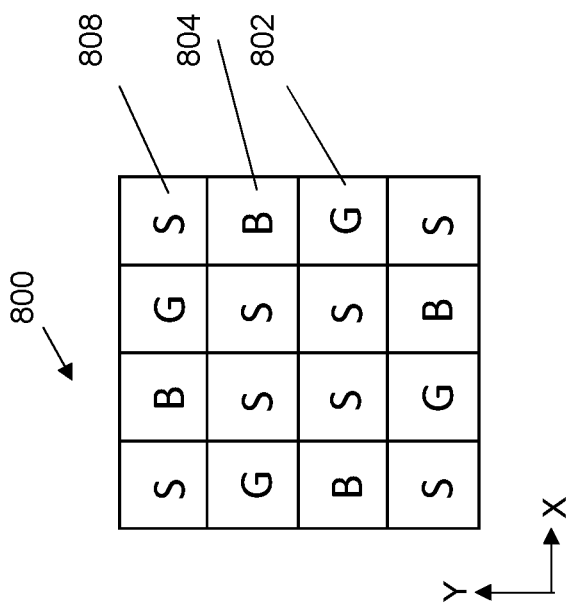

FIG. 8 shows an alternative layout of a photon detector 800, which can be substituted for the photon detector 200 in the radiation detector 9 of FIG. 2 in some embodiments. The photon detector 800 can have the same arrangement of first detectors 802 and second detectors 804 as the arrangement of first detectors 702 and second detectors 704 in photon detector 700 of FIG. 7. Additionally, all of the vacant regions 706 of photon detector 700 are replaced with third detectors 808 (labeled "S"). Each of the plurality of sides has a border row or a border column adjacent thereto. Each border row has at least one first detector 802 and at least one second detector 804, and each border column has at least one first detector 802 and at least one second detector 804. Each border row and each border column has at least one cell with a third detector 808. In some embodiments, the array has four corners, and each of the four corners has a third detector 808.

Each third detector 808 is sensitive to photons in a wavelength band including at least the first peak wavelength (e.g., blue) and the second peak wavelength (e.g., green). In some embodiments, the third detectors 808 are SiPMs which are selected to improve timing and energy resolution. For example, the third detectors 808 can be SiPMs which have a broad response band, and can capture both blue light and green light, for example. In other examples, the third detectors 808 can be "standard" SiPMs (labeled "S") which have a broad response band, and can capture red, green and blue light, for example. The standard SiPMs 808 provide high timing and energy resolution in the X-Y plane for each slice, while the first (e.g., B) detectors 802 and second (e.g., G) detectors 804 differentiate the color of scintillation light for DOI measurement in the Z direction. The broad response band of the standard SiPMs 808 allow the SiPMs 808 to collect larger amounts of energy, improving resolution and signal-to-noise ratio (SNR) when compared to narrow response band SiPMs.

Figure 10:
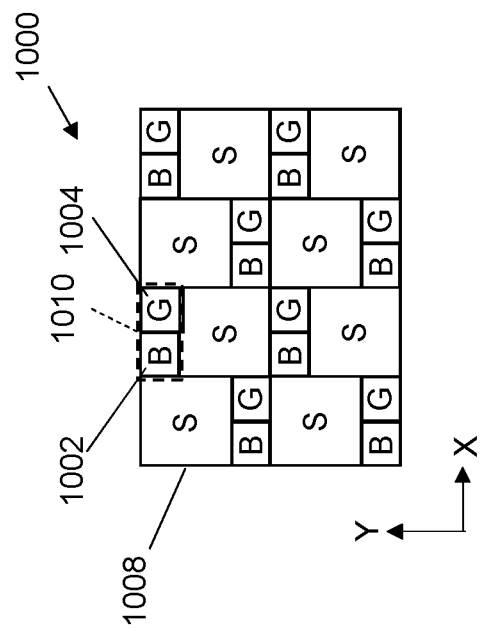
Figure 9:
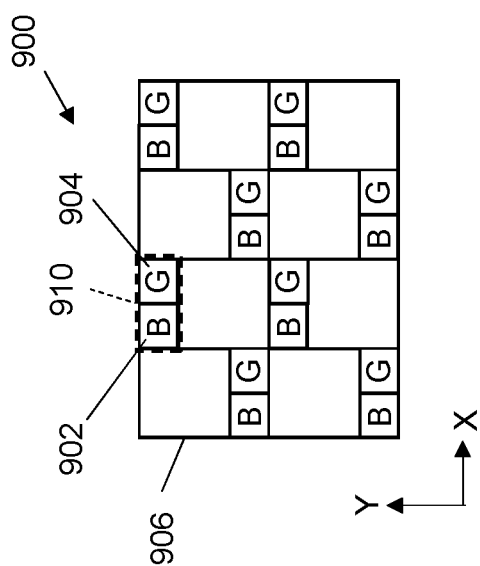

FIGS. 9 and 10 show two alternative photon detector configurations 900 and 1000, respectively, which can be substituted for the photon detector 200 in the radiation detector 9 of FIG. 2 in some embodiments. In some embodiments, the 2D arrays 900, 1000 have at least one row or column containing at least one split cell 910, 1010, and each of the split cells 910, 1010 comprises one of the first detectors 902, 1002 having a first area, one of the second detectors 904, 1004 having a second area. The remaining areas 906, 1008 are larger than the first area and larger than the second area. In FIGS. 9 and 10, the first detectors 902, 1002 and second detectors 904, 1004 are smaller SiPMs, optimized for differentiation of the color of the scintillation light.

FIG. 9 shows a photon detector 900. The 2D array 900 has a plurality of sides. Each of the plurality of sides has a border row or a border column adjacent thereto. Each border row has at least one first detector 902 and at least one second detector 904, and each border column has at least one first detector 902 and at least one second detector 904. Each border row and each border column has at least one vacant region 906 without a photon detector. In some embodiments, each row and each column have at least one split cell 910. Each of the plurality of rows includes at least one first detector 902 (B), at least one second detector 704 (G), and at least one vacant region 906 without a photon detector. The vacant region 906 is larger than a sum of the first area of first detector 902 and the second area of second detector 904. Each of the plurality of columns has at least one first detector 902 (B), at least one second detector 704 (G), and at least one vacant region 906 without a photon detector. The smaller first detectors 902 and second detectors 904 can be used as a "binary switch" to generate signals which allow the discrimination between the upper layer 94 and lower layer 92 of scintillators. The photon detector 900 uses sparse SiPM density to reduce cost, while providing binary DOI information.

FIG. 10 shows a photon detector 1000 having a layout similar to the layout of FIG. 9, except all of the vacant regions 906 in FIG. 9 are replaced with third SiPMs 1008 in FIG. 10. The 2D array has at least one row or column of split cells 1010, and each of the split cells 1010 comprises one of the first detectors 1002 having a first area, one of the second detectors 1004 having a second area, and a remaining area that is larger than the first area and larger than the second area. The remaining area includes a third detector 1008, which can be an SiPM. The third detector 1008 is sensitive to photons in a wavelength band including at least the first peak wavelength (of the first scintillators 91) and the second peak wavelength (of the second scintillators 93). In some embodiments, the first peak wavelength corresponds to blue light, the second peak wavelength corresponds to green light, and the third detector is responsive to green light and blue light.

In some embodiments, the third detectors 1008 are SiPMs which are selected to improve timing and energy resolution, and the first detectors 1002 and second detectors 1004 are smaller SiPMs which are optimized for the differentiation of the color of the scintillation light. The smaller "B"- and "G"-SiPMs can be used as a "binary switch" to generate signals which allow the discrimination of whether the scintillation light originates from the lower or upper layers 92, 94 of scintillators. The Anger position and timing can either be based on signals from all of the first, second and third detectors 1002, 1004, 1008, or just the third detectors 1008. In some embodiments, the remaining area containing the third detector 1008 is larger than a sum of the first area of the first detectors 1002 and the second area of the second detectors 1004.

The third sensors 1008 can be SiPMs which have a broad response band, and can capture and detect both blue light and green light, for example. In other examples, the third detectors 1008 can be capable of detecting red, green and blue light. The standard SiPMs 1008 provide high timing and energy resolution in the X-Y plane for each slice, while the first (e.g., B) detectors 1002 and second (e.g., G) detectors 1004 differentiate the color of scintillation light for DOI measurement in the Z direction using smaller area sensors.

In the examples above, the first and second detectors are blue and green. In other embodiments, the first and second detectors are red and green. In other embodiments, the first and second detectors are red and blue.

Figure 11:
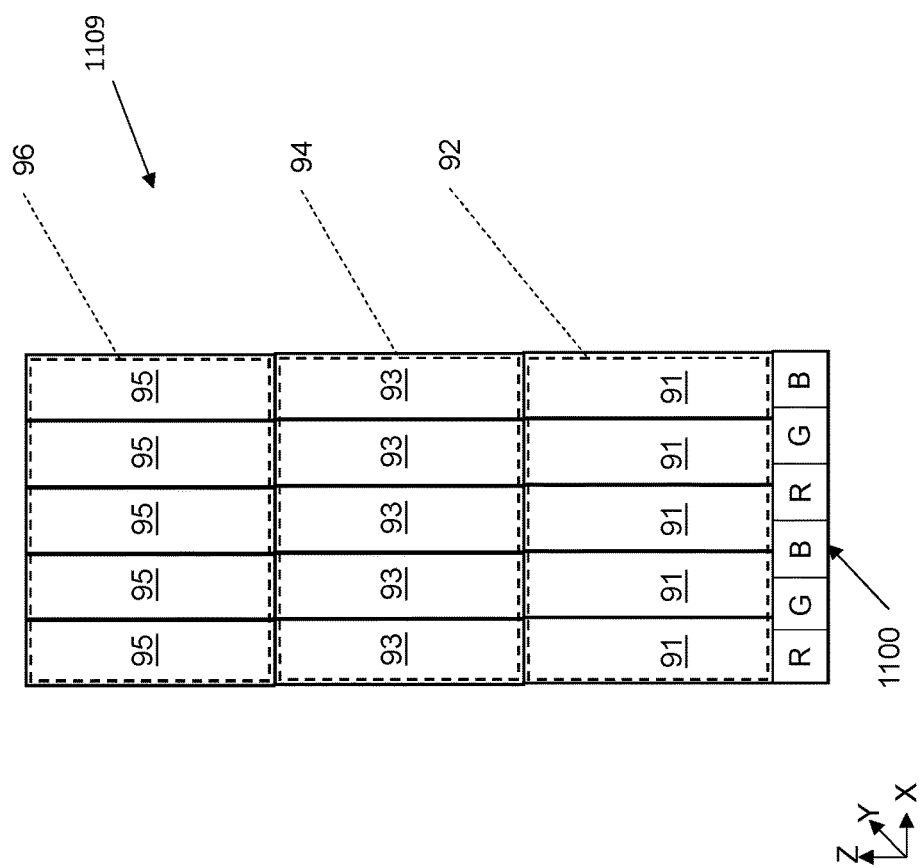
FIG. 11 shows a cross sectional view of an alternative radiation detector for the PET scanner of FIG. 1, including a third scintillator.
Figure 12A:
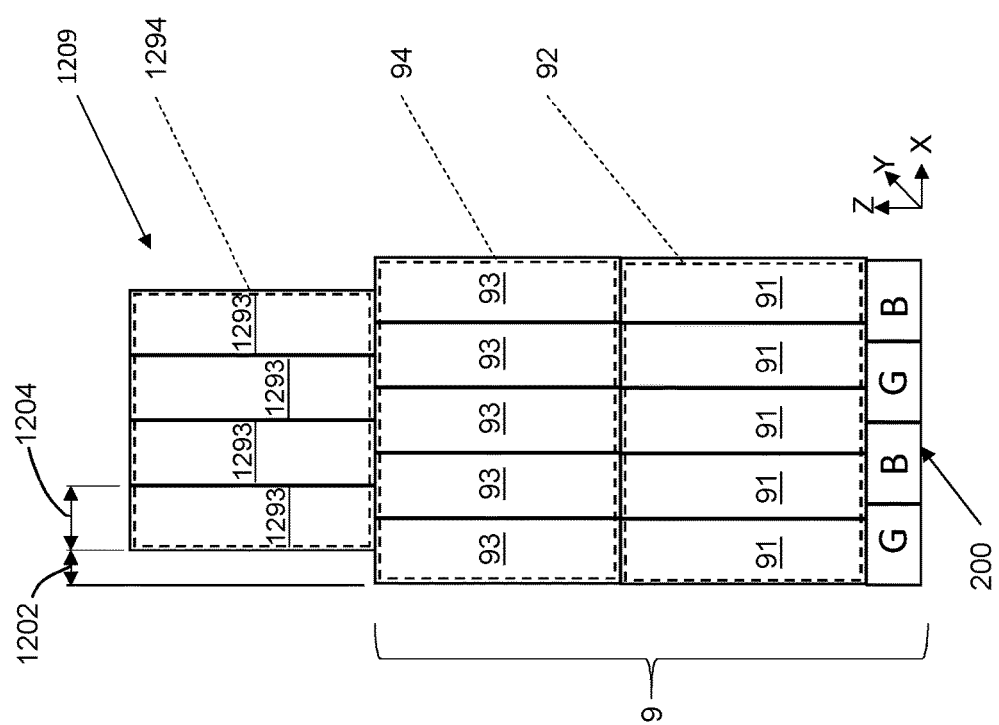
FIG. 12A is a cross sectional view of another alternative radiation detector for the PET scanner of FIG. 1, including a shifted crystal third scintillator.

FIGS. 11 and 12A show two variations in which a third scintillator layer is added. In each of the examples of FIGS. 11 and 12A, the first and second scintillator materials have different emission characteristic spectrums from each other; the first and second scintillator materials have different emission peak wavelengths from each other; and the first scintillator layer 92 lies directly on (i.e., contacting) the SiPMs with no intervening color filters.

FIG. 11 shows an embodiment of a PET detection block 1109 having three scintillator layers 92, 94, 96. The first scintillator layer 92 comprises first scintillators 91 of a first scintillator material and second scintillators 93 of a second scintillator material, as described above with reference to FIG. 2. In FIG. 11, the third scintillator layer 96 of radiation detector 1109 can comprise third scintillators 95 of a third scintillator material which emits red light when a gamma ray is absorbed in the third scintillator layer 96. Directly underneath the first scintillator layer 92 is an array 1100 of three groups of photon detectors, such as SiPMs, labeled R, G, and B, respectively. The first scintillator layer is positioned over and contacting each of the plurality of photon detectors R, G, and B. Each photon detector is capable of detecting photons. The plurality of photon detectors include first detectors sensitive to photons of the first peak wavelength (e.g., blue), second detectors sensitive to photons of the second peak wavelength (e.g., green), and third detectors sensitive to photons of the third peak wavelength (e.g., red).

The first detectors (SiPMs) B, second detectors (SiPMs) G, and third detectors (SiPMs) R are arranged in a two-dimensional (2D) array 1100 for measuring 2D coordinates of each impinging photon. The SiPMs B, G, R can be arranged round robin in a pattern with alternating colors in each direction, for example. The configuration of R, G and B SiPMs can be varied according to any of the variations described above in FIGS. 4 to 10. For brevity, descriptions of these variations are not repeated. The three scintillator layers 92, 94, 96 and three types of SiPMs permit additional resolution in the Z direction.

FIG. 12A shows an embodiment of another arrangement for a PET detection block 1209 referred to as a "staggered crystal". The PET detection block 1209 includes the first and second scintillator layers 92, 94 and detector array 200 of the PET detection block 9 (FIG. 2). The staggered crystal configuration of PET detection block 1209 further includes a third scintillator layer 1294. The third scintillator layer 1294 is offset in the X (or Y) direction from the second scintillator layer 94 by a distance 1202 that is one half the width 1204 of a crystal 93.

The structure and operation of the first and second scintillator layers 92, 94 and the photon detector array 200 are the same as described above with respect to the PET detection block 9 of FIGS. 2 and 3, a description of which is not repeated for brevity. Additionally the crystals 1293 of the third scintillator layer 1294 can comprise the same second scintillator material as the second scintillator layer 94. The light emitted from the third scintillator layer 1294 can have the same peak wavelength and same emission spectrum as the light emitted from the second scintillator layer 94. Thus, gamma events occurring in the third scintillator layer 1294 are detected by the second detectors 204, which are the same type of detectors (e.g., green SiPMs) that detect the light from the scintillators 93 of the second scintillator layer 94. Because of the offset 102 between the crystals 1293 of the third scintillator layer 1294 and the crystals 93 of the second scintillator layer 94, light emitted by the third scintillator layer 1294 can be distinguished from light emitted by the second scintillator layer 94 based on spatial information. When a crystal 1293 in the third scintillator layer 1294 emits photons, the location of peak intensity is below the centroid of the crystal 1293, which is offset by a distance 1202 from the centroid of light emitted by the crystals 93 of the second scintillator layer 94. Thus, the processor can determine whether light is received from the second scintillator layer 94 or the third scintillator layer 1294 based on the location of the peak intensity of light received by the second (e.g., green-sensitive) SiPMs.

Figure 12B:
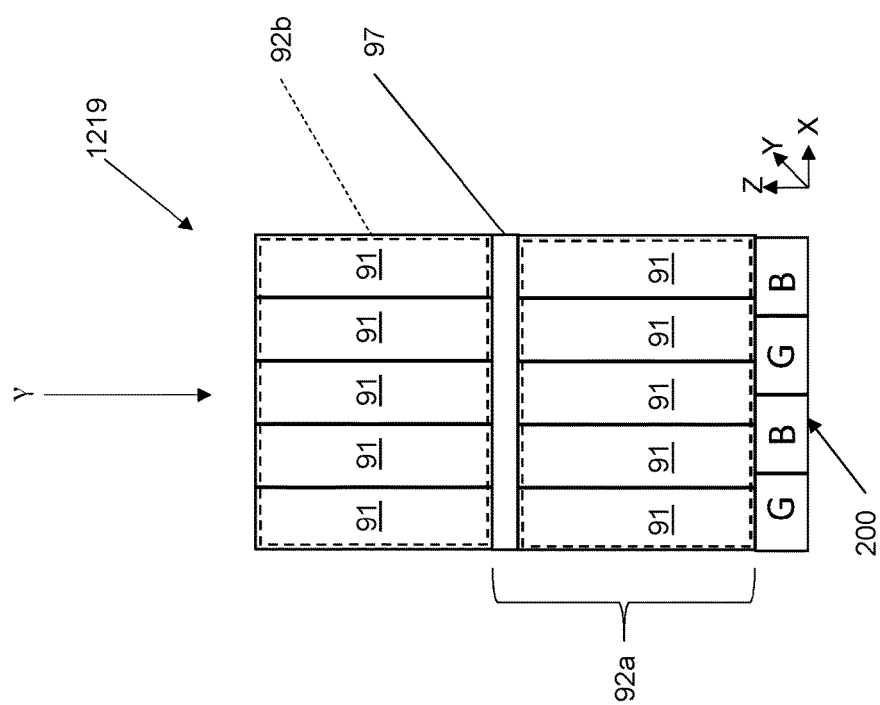
FIG. 12B is a cross sectional view of a radiation detector for the PET scanner of FIG. 1, in which both scintillators have the same scintillation material.

FIG. 12B shows an embodiment of the radiation detector 1219 comprising a first scintillator 92a having a first emission spectrum and a first peak wavelength, and a second scintillator 92b positioned above the first scintillator 92a. The second scintillator 92b has a second emission spectrum and a second peak wavelength different from the first emission spectrum and the first peak wavelength. The first scintillator 92a is positioned over and contacts each of a plurality of photon detectors 200. The plurality of photon detectors 200 includes first detectors G sensitive to photons of a first peak emission wavelength of the first emission spectrum and second detectors B sensitive to photons of a second peak emission wavelength of the second emission spectrum. The first scintillator 92a comprises a first layer 91 of a first scintillation material, and the second scintillator 92b comprises a second layer 91 of the first scintillation material. The first scintillator layer 92a and second scintillator layer 92b can comprise the same scintillation material as each other. The first scintillator 92a further comprises a wavelength shifter 97, between the first layer 91 of the first scintillation material and the second layer 91 of the first scintillation material. Thus, the addition of the wavelength shifter 97 allows both scintillators 92a, 92b to have the same scintillation material as each other, but still provide distinguishably different emission spectra to the detector array 200. The first detectors G are more sensitive to the first emission spectrum (e.g., green) than the second emission spectrum (e.g., blue). The second detectors B are more sensitive to the second emission spectrum (e.g., blue) than the first emission spectrum (e.g., green In operation, when radiation (e.g., gamma rays γ) reaches radiation detector 1219, most light emitted by the second scintillator 92b and received by the photosensor 200 passes through the wavelength shifter 97, where it is wavelength shifted. The light emitted by the scintillator 92a (adjacent the photosensor 200) does not pass through wavelength shifter 97 and has its original emission spectrum.

The wavelength shifter 97 can be a layer of photo-fluorescent material which absorbs higher frequency photons and emits lower frequency photons. In some embodiments, the wavelength shifter 97 comprises a polyvinyltoluene polymer base. For example, in some embodiments, the wavelength shifter can be a layer of EJ-280 (green) or EJ-284 (red) wavelength shifting plastics, sold by ElJen Technology of Sweetwater, Tex. For example, the EJ-280 material has an absorption peak wavelength at 425 nm and an emission peak wavelength at 490 nm. The EJ-284 material has an absorption peak wavelength at 570 nm and an emission peak wavelength at 610 nm.

The shift in the wavelength between absorbed light and emitted light is sufficient to be detected by the plurality of detectors. For example, wavelength shifter 97 can shift the peak emission wavelength upwards, from blue to green, from green to red, or from red to infrared. The wavelength shifter 97 also changes the spectrum of the light emitted by the second scintillator 92b.

FIGS. 12C and 12D show another embodiment of a radiation detector 1229 where the second detectors 1213 differ from the first detectors 1211 in front-versus-backside illumination geometry. The radiation detector 1229 can have the same scintillators 92a, 92b as the radiation detector 9 of FIG. 2, and a different array 1210 of photo detectors. The radiation detector 1229 includes a first scintillator 92a having a first emission spectrum and a second scintillator 92b positioned above the first scintillator 92a. The first scintillator 92a comprises a first layer 91 of a first scintillation material, and the second scintillator 92b can comprise a layer 93 of the second scintillation material. The second scintillator 92b has a second emission spectrum different from the first emission spectrum. The first scintillator 92a is positioned over and contacts an array 1210 containing a plurality of photon detectors 1211, 1213. The array 1210 of photon detectors includes first detectors 1211 sensitive to photons of a first peak emission wavelength of the first emission spectrum and second detectors 1213 sensitive to photons of a second peak emission wavelength of the second emission spectrum. The first scintillator layer 92a and second scintillator layer 92b can comprise different scintillation materials from each other. so as to provide distinguishably different emission spectra to the detector array 1210.

FIG. 12D is an enlarged detail showing a first detector 1211 and a second detector 1213. In some embodiments, the first detector 1211 and the second detector 1213 can have the same type of photo sensor integrated circuit 1215, but respectively different front-versus-backside illumination geometries. Each photo sensor integrated circuit 1215 has a front (active) face 1217 and a backside face 1218. The photo sensor integrated circuits 1215 are capable of front illumination or backside illumination. For example, in the configuration shown, the first detectors 1211 are front illuminated, and the second detectors 1213 are backside illuminated. Light detected by the second (backside illuminated) detectors 1213 passes through an additional semiconductor layer before impinging on the front face 1217 of the photo sensor integrated circuits 1215 of the second detectors 1213, shifting the wavelength of the detected light.

Although the first detectors 1211 and second detectors 1213 of FIG. 12D include the same photo sensor integrated circuit 1215 as each other, in other embodiments (not shown) the first detectors and second detectors may have respectively different front-versus-backside illumination geometries as well as respectively different photo sensor integrated circuits.

Figure 14:
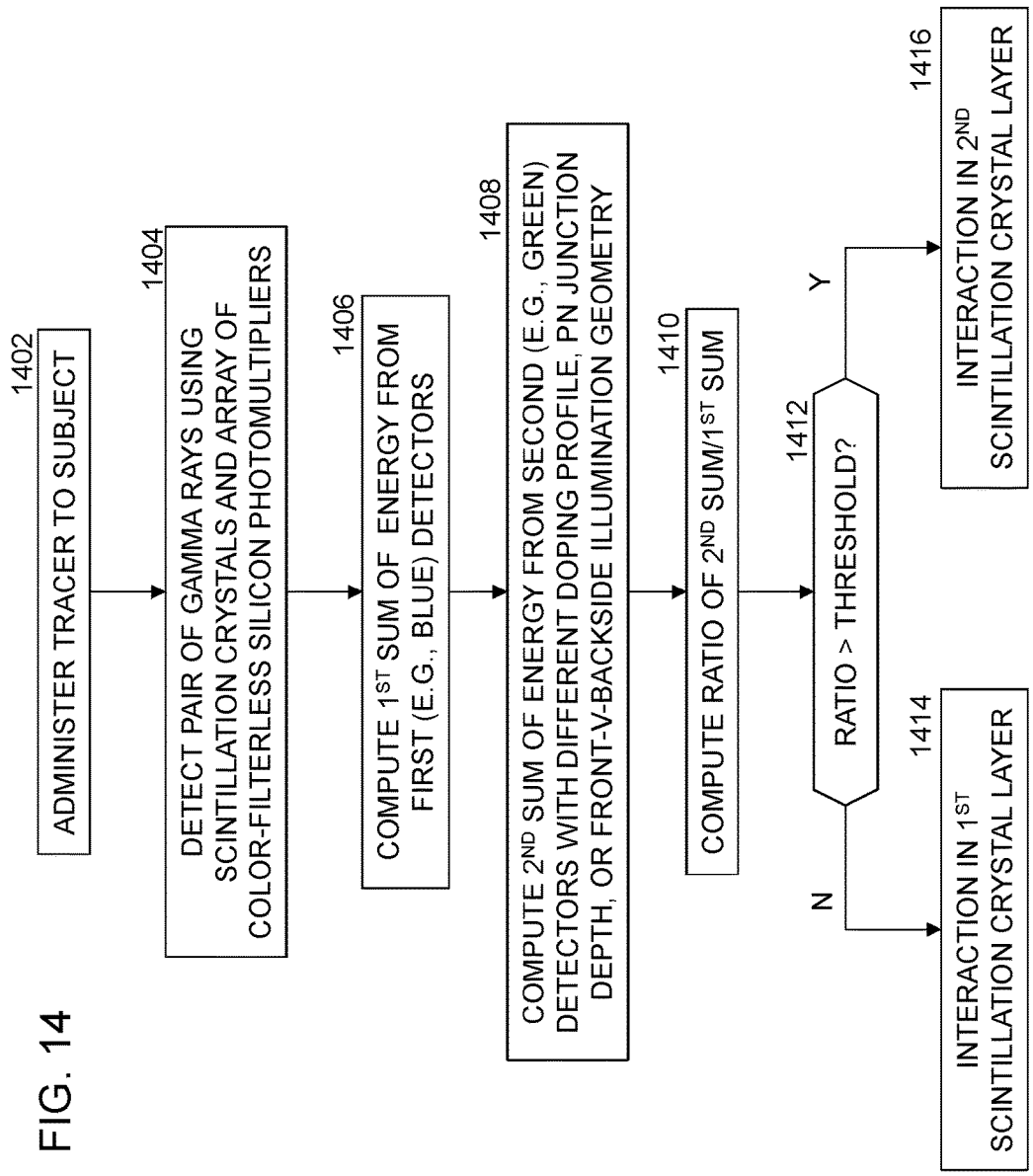
FIG. 14 is a flow chart of a method of determining a depth of interaction for a gamma event.

FIG. 14 is a flow chart of a method of determining a depth of interaction for a gamma event in a positron emission tomography system having a plurality of scintillator layers, with the bottom one of the scintillator layers in direct contact with an array of SiPMs, and without any color filter between the SiPMs and the bottom scintillator layer.

At step 1402, a tracer is administered to a subject (e.g., by injection). The tracer can be a positron-emitting radionuclide, such as fludeoxyglucose (FDG).

At step 1404, a pair of gamma rays emitted by decay of the tracer is detected using two or more stacked scintillator layers in each of a pair of PET detector blocks. Each gamma ray is detected by a respective PET detector block approximately 180 degrees apart from each other. One of the scintillator layers is above and contacting an array of filterless silicon photomultipliers (SiPMs). The array has a plurality of first SiPMs with a first spectral response, and a plurality of second SiPMs with a second spectral response different from the first spectral response.

Steps 1406-1410 determine which of the first SiPMs or the second SiPMs outputs more energy in response to the detecting.

At step 1406, the control device 6 computes a first sum of energy output by the first SiPMs, which indicates the total light energy emitted by the first scintillator layer 92 in response to a gamma event.

At step 1408, the control device 6 computes a second sum of energy output by the second SiPMs, which indicates the total light energy emitted by the second scintillator layer 94 in response to a gamma event.

At step 1410, the control device 6 computes a ratio of the second sum to the first sum.

At step 1412, the control device 6 compares the ratio (of the second sum to the first sum) to a threshold value, and identifies a depth of interaction of the gamma rays based on whether the ratio exceeds the threshold. The ratio is based on which of the first SiPMs or the second SiPMs outputs more energy per detector. The threshold can be 1.0 in embodiments where the SiPM array 200 has equal numbers of first detectors 202 and second detectors 204 (e.g., FIG. 3). Alternatively, the threshold can be normalized in the case (e.g., FIGS. 4 and 5) where the SiPM array has unequal numbers of first detectors 402, 502 and second detectors 404, 504. For example, if there are three times as many first detectors 402 as second detectors 404, the threshold ratio can be ⅓. Similarly, the threshold can be normalized to compensate for different detector areas and/or different absorptivities between the first detectors 402 and the second detectors 404.

At step 1414, the gamma rays from the gamma event are identified as having been absorbed in the first scintillator layer 92 in the case where the ratio is less than or equal to the threshold value. Thus, the DOI is identified as being within the first scintillator layer 92.

At step 1416, the gamma rays from the gamma event are identified as having been absorbed in the second scintillator layer 94 in the case where the ratio exceeds the threshold value. Thus, the DOI is identified as being within the second scintillator layer 94.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A radiation detector, comprising:
a first scintillator having a first peak wavelength;
a second scintillator positioned on the first scintillator, the second scintillator having a second peak wavelength different from the first peak wavelength; and
a plurality of photon detectors, the first scintillator positioned over and contacting each of the plurality of photon detectors, the plurality of photon detectors including first detectors and second detectors, where the second detectors differ from the first detectors in doping profile, pn junction depth, or front-versus-backside illumination geometry, the first detectors being more sensitive to the first peak wavelength than the second peak wavelength, the second detectors being more sensitive to the second peak wavelength than are the first detectors;
wherein the first detectors and second detectors are arranged in a two-dimensional (2D) array for measuring 2D coordinates of impinging photons;
wherein the 2D array has a plurality of sides where each of the plurality of sides has a border row or a border column adjacent thereto, and each border row and each border column has at least one first detector and at least one second detector;
wherein each border row and each border column has at least one third detector and each third detector is sensitive to photons in a wavelength band including the first peak wavelength and the second peak wavelength.

2. The radiation detector of claim 1, wherein a respective second detector is located in each of a plurality of corners of the 2D array, and a remainder of the plurality of photon detectors comprises first detectors.

3. The radiation detector of claim 1, wherein:
the 2D array has a plurality of rows and a plurality of columns;
each of the plurality of rows includes at least one first detector and at least one second detector; and
each of the plurality of columns includes at least one first detector and at least one second detector.

4. The radiation detector of claim 1, wherein:
each of the first detectors has a first area,
each of the second detectors has a second area, and
the first area is greater than the second area.

5. The radiation detector of claim 1, wherein each border row and each border column has at least one cell without a photon detector.

6. The radiation detector of claim 1, wherein:
the first scintillator comprises Lutetium-yttrium oxyorthosilicate, $Lu_{2(1-x)}Y_{2x}SiO_5$, and
the second scintillator is more sensitive to green light than the first scintillator.

7. The radiation detector of claim 1, wherein the plurality of photon detectors include silicon photomultipliers.

8. A radiation detector, comprising:
a first scintillator having a first peak wavelength;
a second scintillator positioned on the first scintillator, the second scintillator having a second peak wavelength different from the first peak wavelength; and
a plurality of photon detectors, the first scintillator positioned over and contacting each of the plurality of photon detectors, the plurality of photon detectors including first detectors and second detectors, where the second detectors differ from the first detectors in doping profile, pn junction depth, or front-versus-backside illumination geometry, the first detectors being more sensitive to the first peak wavelength than the second peak wavelength, the second detectors being more sensitive to the second peak wavelength than are the first detectors;
wherein the first detectors and second detectors are arranged in a two-dimensional (2D) array for measuring 2D coordinates of impinging photons;
wherein the 2D array has a plurality of sides where each of the plurality of sides has a border row or a border column adjacent thereto, and each border row and each border column has at least one first detector and at least one second detector;
wherein the array has four corners, and
each of the four corners has a third detector.

9. A radiation detector, comprising:
a first scintillator having a first peak wavelength;
a second scintillator positioned on the first scintillator, the second scintillator having a second peak wavelength different from the first peak wavelength; and
a plurality of photon detectors, the first scintillator positioned over and contacting each of the plurality of photon detectors, the plurality of photon detectors including first detectors and second detectors, where the second detectors differ from the first detectors in doping profile, pn junction depth, or front-versus-backside illumination geometry, the first detectors being more sensitive to the first peak wavelength than the second peak wavelength, the second detectors being more sensitive to the second peak wavelength than are the first detectors;
wherein the first detectors and second detectors are arranged in a two-dimensional (2D) array for measuring 2D coordinates of impinging photons;
wherein the 2D array has at least one row or column of split cells, and each of the split cells comprises one of the first detectors having a first area, one of the second detectors having a second area, and a remaining area that is larger than the first area and larger than the second area.

10. The radiation detector of claim 9, wherein the remaining area is larger than a sum of the first area and the second area.

11. The radiation detector of claim 9, wherein the remaining area includes a third detector sensitive to photons in a wavelength band including at least the first peak wavelength and the second peak wavelength.

12. The radiation detector of claim 11, wherein the first peak wavelength corresponds to blue light, the second peak wavelength corresponds to green light, and the third detector is responsive to green light and blue light.

13. A positron emission tomography (PET) system, comprising:
a PET scanner, comprising:
a first scintillator having a first peak wavelength;
a second scintillator positioned on the first scintillator, the second scintillator having a second peak wavelength different from the first peak wavelength; and
a plurality of photon detectors, the first scintillator positioned over and contacting each of the plurality of photon detectors, the plurality of photon detectors including first detectors and second detectors, where the second detectors differ from the first detectors in doping profile, pn junction depth, or front-versus-backside illumination geometry, the first detectors being more sensitive to the first peak wavelength than the second peak wavelength, the second detectors being more sensitive to the second peak wavelength than are the first detectors;
wherein the first detectors and second detectors are arranged in a two-dimensional (2D) array for measuring 2D coordinates of impinging photons;
wherein the 2D array has a plurality of sides where each of the plurality of sides has a border row or a border column adjacent thereto, and each border row and each border column has at least one first detector and at least one second detector;
wherein each border row and each border column has at least one third detector and each third detector is sensitive to photons in a wavelength band including the first peak wavelength and the second peak wavelength; and
a processor configured to determine in which of the first scintillator or the second scintillator photons are emitted, the processor configured to collect and store three-dimensional scan data received from said PET scanner.

14. The system of claim 13, wherein:
the first scintillator comprises a first layer of a first scintillation material and a wavelength shifter on the first layer of the first scintillation material, and
the second scintillator comprises a second layer of the first scintillation material.

* * * * *